Figure 1:
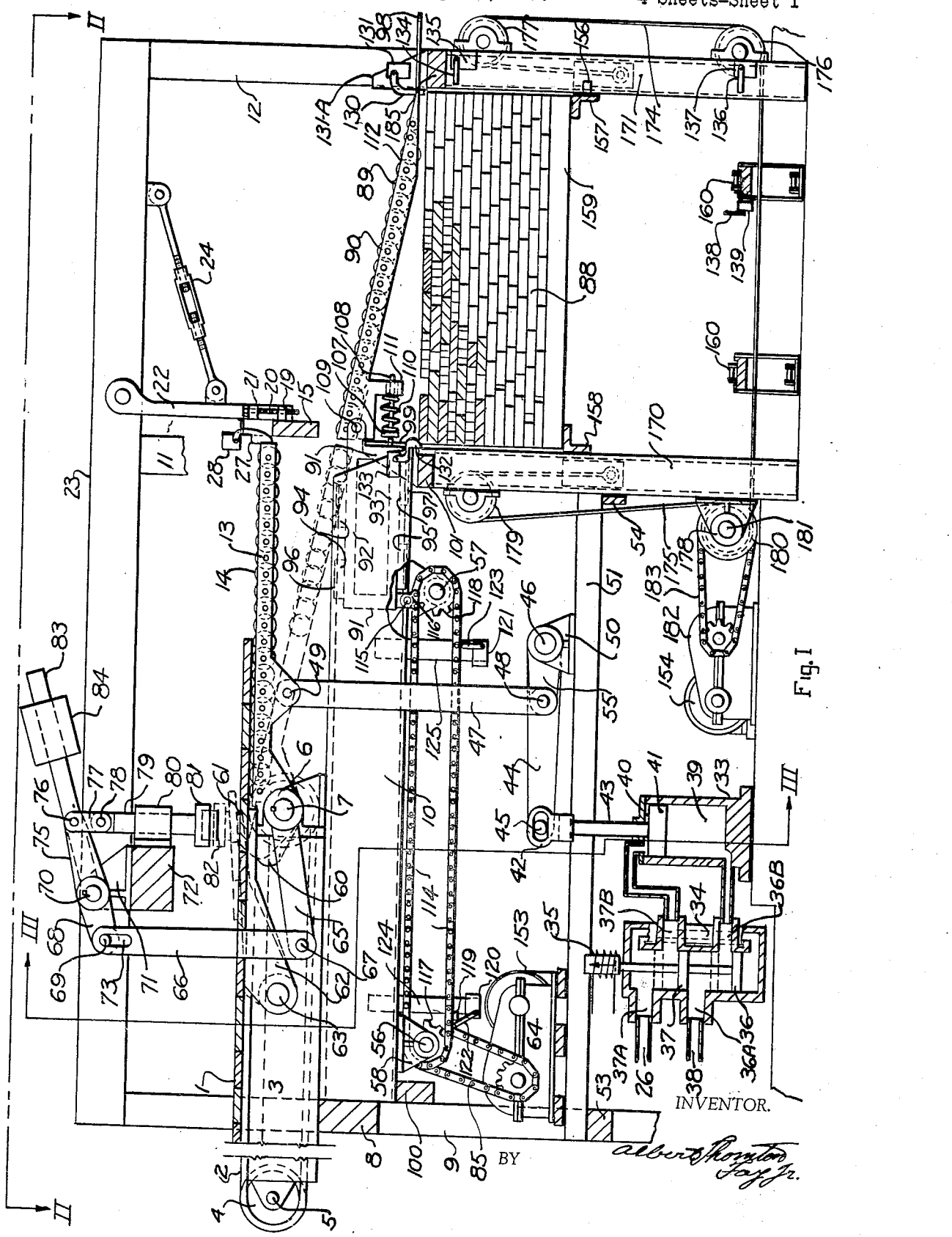

Dec. 29, 1936.                    A. T. FAY, JR                    2,065,674
              APPARATUS FOR TIERING, FEEDING, AND LOADING MATERIALS
                        Filed Aug. 13, 1932           4 Sheets-Sheet 1

INVENTOR.
Albert Thornton Fay Jr.
BY

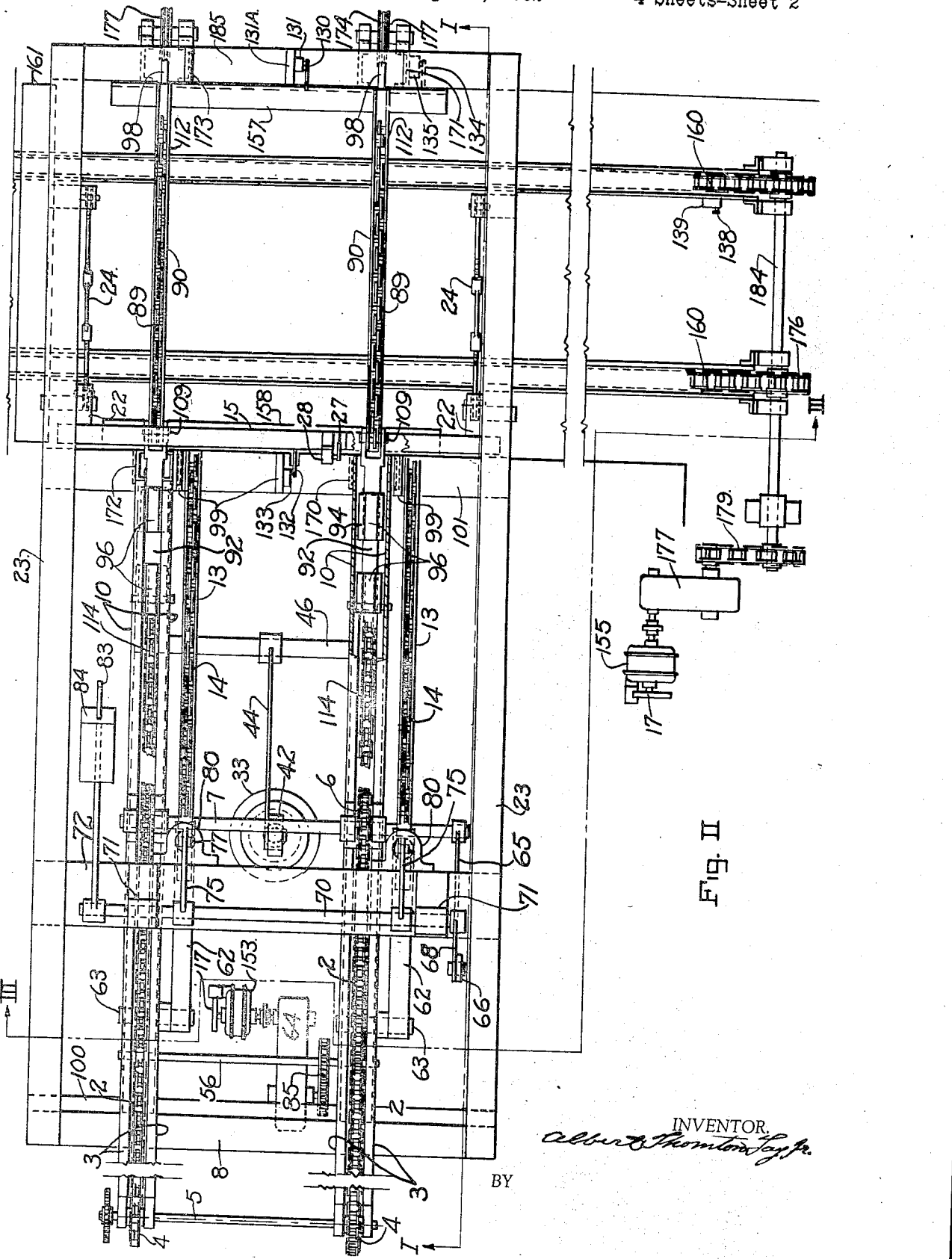

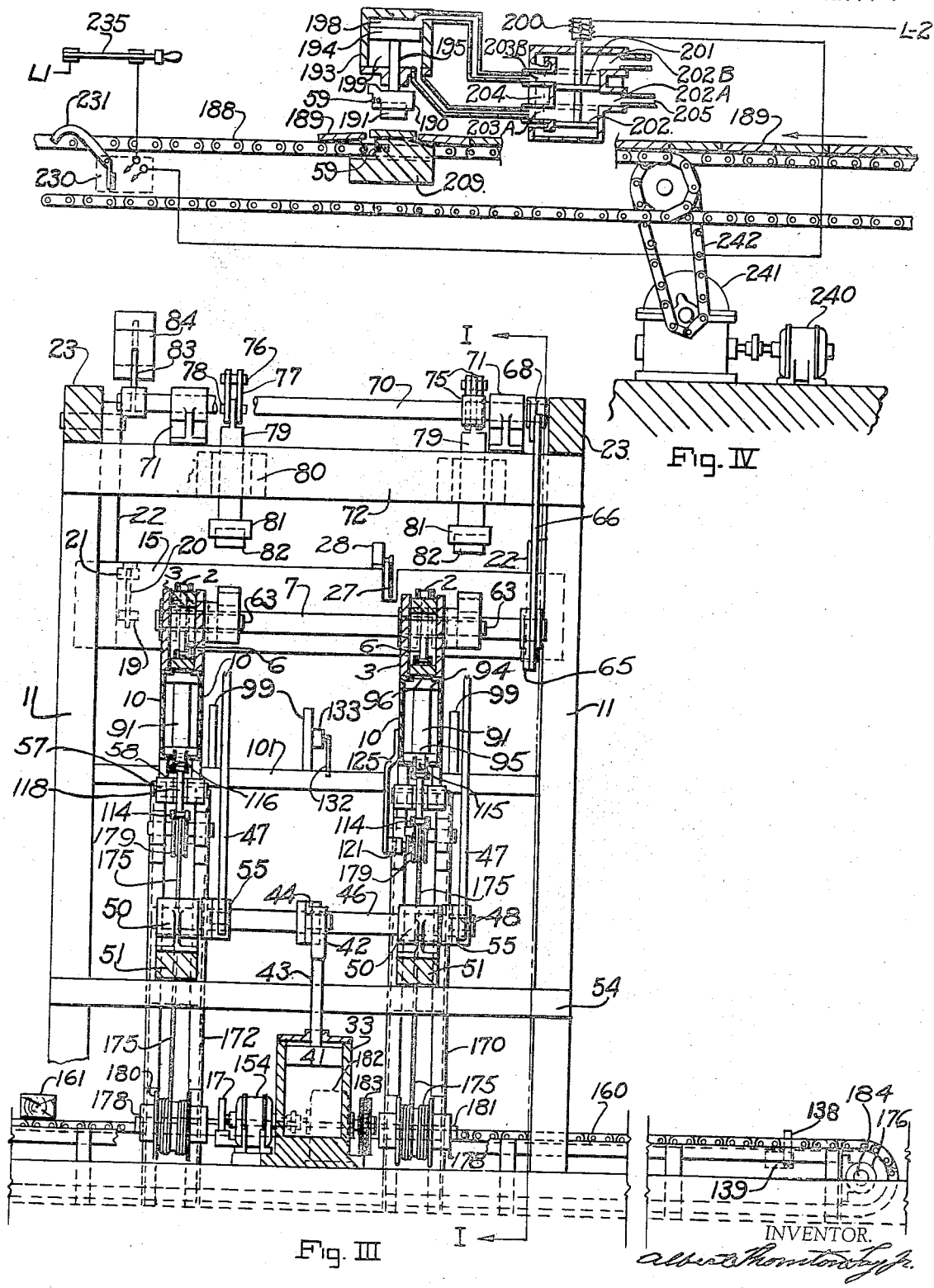

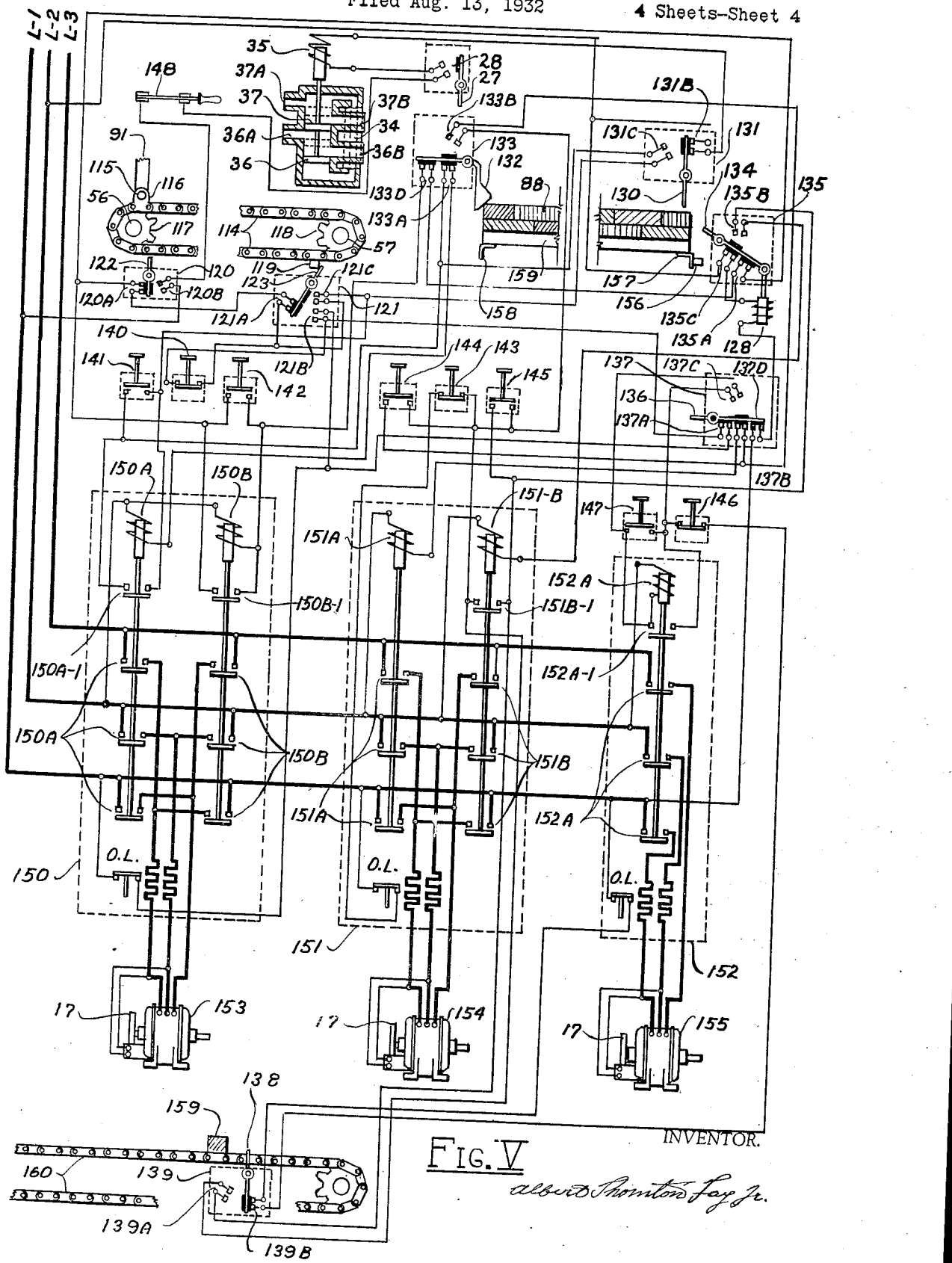

Patented Dec. 29, 1936

2,065,674

UNITED STATES PATENT OFFICE 2,065,674

APPARATUS FOR TIERING, FEEDING, AND LOADING MATERIALS

Albert Thornton Fay, Jr., Portland, Oreg.; Pauline Fay, administratrix of said Albert Thornton Fay, Jr., deceased, assignor to Moore Dry Kiln Company of Oregon, North Portland, Oreg., a corporation Application August 13, 1932, Serial No. 628,666

13 Claims. (Cl. 214—6)

My invention relates to a novel tiering, feeding and loading device, and to the method of tier measuring, tiering, stacking, or loading.

An object of my invention is to provide a novel means for tiering and loading stock spread out in sheets as tiers, onto a stock load, either with or without stickers between tiers.

Another object of my invention is to provide an automatic tier measuring, and tier feeding device for any process, stacker or loader.

Another object of my invention is to provide a novel tier feeding, or feeding and loading device or process, automatic in its operation for feeding a machine, or loading materials which may be the product of a machine.

Another object of my invention is to provide a novel automatic stacking or loading apparatus, for converting a supply of stock in sheets from any process, into tiers, and of segregating, feeding and loading the tiers on a stock load, of conveying said stock load away, and of positioning other load carriers for, and loading a new stock load in an iterant automatic process.

What constitutes my invention will be hereinafter specified in detail and succinctly defined in the appended claims.

In the accompanying drawings wherein my invention is illustrated in preferred form of embodiment, Figure I is a transverse vertical section illustrating my feeding and loading apparatus.

Figure II is a partial plan view of Figure I.

Figure III is a partial longitudinal vertical section taken along the lines III—III of Figures I and II.

Figure IV is a transverse section of a tiering and feeding apparatus, illustrating a modified form of my invention.

Figure V is a diagrammatic electrical wiring diagram, indicating a control system for my feeding and loading apparatus.

My feeding apparatus may be applied to any type of stacker or loader, to any machine feeding, time feeding processes for machines or processes, or for loading the products of machines. Reference is made to the feeding, tiering, and loading of lumber, but it is to be understood that any other layered material may be similarly handled.

Referring to the numerals on the drawings:

1 indicates a sheet of stock illustrated, for example, as lumber of variable width and length on the supply conveyor chain, or cable 2, which may be supplied from a planer, or from any process or other source to be loaded, stacked, tiered or fed. The lumber may vary in thickness from time to time. The conveyor chain 2 is supported by any suitable means, for example, by the conveyor stringers 3. The chain preferably has a smooth top and may be of any preferred number of runs, and of any usual type, driven by the sprockets 4, fixed to the shaft 5, journaled in suitable bearings. The sprockets 4 may be driven by any suitable means. The chain 2 also passes over idler sprockets 6, rotating freely on the shaft 7, which is journaled in suitable bearings. The supply conveyor stringers 3 may be supported in any preferred manner, as by the cross beam 8, supported by the posts 9, and by the guide members 10.

I preferably provide a stop means, illustrated above the chains 2, which may stop the movement of the sheet of stock 1, on the conveyor 2. This stop means may be applied from above, or a raising means may be applied from below, lifting the sheet of material off of the chains 2, and clamping it against a stationary stop above said chain. Beyond this stop I preferably provide a tier stop in the path of the layer, or sheet of stock on the conveyor, and which may be mounted either above or below the conveyor chain. The actuation of the tier stop controls the operation of the overhead stop to alternately stop and start the sheet of stock 1, for releasing tiers for a feeding or loading process.

In one application of my invention I preferably employ a raising and lowering apron 13, which may be raised and lowered in front of a tier stop, to stop a sheet of material and release a tier for a feeding or loading process. The apron preferably comprises a plurality of arms having gravity rolls 14, or a skid surface. The apron 13 may be rigidly attached, preferably keyed to the shaft 7, or to any suitable pivot means. The apron 13, is preferably continuous with the conveyor chain 2, so that lumber fed from the conveyor will be supplied in a sheet, the boards edge to edge on the apron 13, against a tier stop which may be mounted on the beam 15. The beam 15 is preferably adjustable for height by the screws 20, which turn freely in the lugs 21, which are attached to the hinged arms 22, which are pivotally attached to overhead beams 23, which are supported by the posts 9, 11, and 12. The screws 20 are threaded into the nuts 19, which are an integral part of the stop beam 15. The tier stop beam 15 is also adjustable for distance away from the overhead stop cushion 82, which distance may be varied as desired to determine the width of each tier. Adjustment may be made by the rod and turnbuckle assemblies 24, connecting the hinged arms 22, with the overhead beams 23. It is understood that any suitable tier stop design and means of adjustment of the tier stop beam may be employed.

For example, when a sheet of lumber fills the apron 13, it may actuate the trigger 27, of the tier limit switch 28, mounted on the tier stop beam 15, and close the circuit to a four-way solenoid operated valve 35, for example, having valves 36 and 37, and the ports 36—A, 36—B, 37—A and 37—B. When the solenoid 35 is energized, the port 36—A is open to the port 37—B, and the port 36—B is open to the port 37—A, through the passage 34. A supply of gas, compressed air for example, from the supply pipe 38, may pass into the air chamber 40, of the cylinder 33, which lowers the piston 41, exhausting the contents of the chamber 39, through the ports 36—B, the passage 34, the port 37—A, and out the pipe 26. This action of the piston 41, lowers the scotch yoke 42, attached to the piston rod 43, which lowers the piston arm 44, which is connected to the scotch yoke 42 by the pin 45. The lowering of the piston arm 44, turns the shaft 46, to which it is keyed or otherwise fixed, through an arc, lowering the skid raising arm 55, which is also fixed to the shaft 46, and also lowering the skid connecting rod 47, which is pinned to the skid raising arm 55, by the pin 48, and pinned to the apron 13, by the pin 49.

The shaft 46 may be mounted in suitable journal bearings 50, which are shown mounted on the supporting member 51, supported by the beam 54, mounted on the elevator columns 170 and 172, on one end, and the beam 53, at the other end, mounted on the conveyor supporting posts 9, which may rest on the ground.

When the apron 13 is lowered, its heel 60 is raised, elevating the end 61 of the stock lift arm 62, which in turn raises the stock 1 immediately above it, off of the conveyor chain 2. The stock lift arm 62 may be pivoted on the shaft 63. The raising of the heel 60, is illustrated as one means of lifting the sheet of lumber off of the conveyor chain when the overhead stop cushion 82 clamps the sheet.

When the stop cushions 82, clamp the sheet 1 of material, its movement on the conveyor chain 2, beneath and behind the stop cushion 82, is stopped. See Figure I. When the sheet of material consists of boards of lumber, laying edge to edge on the chain 2, the boards beyond the stop cushion 82, continue their movement as a detached tier. If the sheet is a continuous mass of material that will not readily separate to form tiers when the stop is actuated to stop the sheet 1, as in some cases it may be, means of separating the tiers, such as a shear blade, may be provided and may be made a part of, or may be made to operate with the stop cushions 191. See Figure IV. For example, a knife blade may be attached to the stop socket 190, and to the elevating member 209, by machine screws in the screw holes 59, as shown in Figure IV.

The stop lever arm 65 is preferably keyed to the shaft 7, so that when the raising and lowering apron 13 goes down, the stop lever arm 65 raises the stop connecting rod 66, to which it may be connected by the pin 67. This movement of the stop lever arm 65, raises the stop rocker arm 68, by means of the stop connecting rod 66, to which it is pinned by a pin 69, in preferably a slotted hole 73, in the top of the stop connecting rod 66.

The slot 73 provides for clamping stock varying in thickness.

The rocker arm 68 is preferably rigidly mounted on the shaft 70. The shaft 70 may be journaled in the bearings 71, which may be supported on the beam 72, which is hung from the beams 23. The stop arm 75 may be also rigidly mounted on the shaft 70, and is connected by the pin 76, to the link 77, which in turn may be connected by the pin 78, to the stop 79, mounted in the bearing 80. The lower end of the stop preferably contains a socket 81, for a cushion 82. The weight arm 83, may also be rigidly mounted on the shaft 70, and has an adjustable weight 84, mounted thereon. As the apron 13 goes down, the end 61, of the stop lift arms 62, goes up, lifting the sheet of lumber 1, for example, up above the chain 2. This movement of the apron 13 also forces the stops 81 down, pinching the sheet of lumber between the end of the stop lift arm 62, and the cushion 82, the pressure being controlled by the position of the weight 84, on the weight arm 83.

It is understood that one or more electrically operated motor thrusters, or other stop means may be used if desired, instead of the solenoid valve 35, the cylinder 33, and the apparatus above described.

When loading materials I preferably provide a limit switch 131. having a trigger 130, mounted on a stop bracket 131—A, mounted as on a beam 185, at one side of the elevator. The trigger 130 is actuated by a tier of stock sliding down from the apron 13, on to the loading skid 90, above the stock load, against the stop bracket 131—A, to retract the loading skid 90 and to start the loading operation.

For example, when the stops 81, are applied to stop the sheet of material 1, the tier on the apron is detached from the sheet and may be conveyed for feeding any process, or may be moved with the aid of gravity onto a loading skid 90, positioned over a stock load 88. In this case the tier moves downward on the loading skid and strikes the trigger 130 of the limit switch 131, and is stopped by the bracket 131—A, which also acts as a means of evening the side of the stock load 88. When the trigger 130 is actuated, the circuit is opened to the solenoid 35, which connects the ports 36—A with 36—B, to allow gas pressure from the pipe 38, to enter the chamber 39, to raise the piston 41, and to raise the apron 13. The exhaust gas from the chamber 40, passes out through the ports 37—B, 37—A, and the pipe 26.

The retraction of the loading skid 90, allows the tier to be deposited by gravity on the top of the stock load 88. In some cases the back edge of the tier may strike against the rake means 99, which prevents the tier from moving back with the loading skid. The rake means 99, serves also to even the side of the stock load.

I preferably provide pull-back bars 98, at the ends of the frames of the loading skid 90. These pull-back bars may be fixed horizontally or hinged, and are preferably elevated above the top of the stock load 88, so as to permit the forward movement of the loading skid. They also support the last board of each tier and may pull it back against a rake means 99, or a stop in the backward movement of the loading skid.

It is understood that lumber may be supplied to the tiering and feeding mechanism by any suitable means, for example, by a tilting breakdown hoist, or from a planer machine, an unstacker, or any process.

In other cases I may employ a chain continuation of the conveyor 2, beyond the stop cushion 82, as shown, for example, in Fig. IV and a suitable tier stop corresponding in function to the stop 28, and the trigger 27, except that it may be raised and lowered above and below the chain 2, and also spaced at a suitable distance from the stop 82. Mechanical equivalents of the stops illustrated may be used to alternately stop the sheet 1, and release a tier of stock.

In some cases the tiering and feeding mechanism supplies a reciprocable loading skid 90, for loading materials. In this case the top surface of the reciprocable loading skid is an extension of the surface of the raising and lowering apron 13, when the skid 90 is positioned above the stock load 88. The skid 90 may comprise a plurality of frames having a skid surface, or having gravity rolls 89, to aid in discharging a tier of material therefrom. Each skid arm may comprise at its back end the struts 91, and the chords 92 and 93. The loading skid arms operate together and may be joined together as one unit to form the skid 90. Each loading skid arm is preferably guided by bearing members 94 and 95, attached respectively in any suitable manner to the top and bottom portions of the loading skid 90, and preferably on members such as the chords 92 and 93. The bearing members 94 and 95 are preferably provided with tongues, or other suitable means 96 and 97, respectively, controlled by the loading skid guide members 10, for guiding the movement of loading skid arms in their reciprocating motion. The loading skid guide members 10, are preferably channels having flanges facing each other, and spaced apart to guide the movement of the top and bottom members respectively, of each loading skid arm on its forward and backward movement. The loading skid guide members 10, may be supported at one end by the beam 100, supported by the posts 9, and at the other end by the cross beam 101, supported by the elevator columns 170 and 172. The tongues 96 and 97, may have a closely operative fit between the flanges of the guide members 10, which control the horizontal reciprocating movement of the loading skid 90; however, in some installations, particularly for loading solid stacked loads of lumber, for example, I preferably provide some vertical movement of the nose of each of the loading skid arms so that the loading skid will conform to the level of the top of the stock load. I preferably employ a hinged skid 90, hinged at 109, and having a spring 110, between the struts 91, and the back portion 111, of the nose 112, of the loading skid 90. When a tier of lumber, for example, is on the loading skid, its weight tends to bear down the nose 112, compressing the spring 110, adjustable by the nut 107, on the rod 108, which is fixed to the chord 91, so that the nose glides on the top of the stock load 88. When the loading skid 90, is empty, as in the forward position, the spring 110, tends to hold the nose 112, up above the top of the stock load.

The loading skid is preferably attached or otherwise connected to a reciprocating member, for example, to a chain 114, by means of a pin 115, in a special connecting link 116. The chain 114, is enmeshed with the sprockets 117 and 118, on the shafts 56 and 57, respectively, journaled in bearings 58. The chain 114, is also provided with a lug 119, preferably on the bottom run which moves between two limit switches 120 and 121, spaced to limit the travel of the loading skid, and which may be operated mechanically or electrically.

I preferably provide an elevator of any suitable design for raising and lowering stock loads 88, and for maintaining the top of the stock load at the proper stacking or loading level. I have illustrated a novel cable type elevator, comprising four elevator columns 170, 171, 172 and 173, resting on suitable foundations. Two shoes 157 and 158, one on each side, and extending between columns are shown, which may be raised or lowered by cables 174 and 175, which pass over idler sheaves 176 and 177, on one side, and 178 on the other side of the elevator. These sheaves are preferably mounted on shafts which are journaled in suitable bearings.

The drums may be mounted on a common shaft 181, mounted in suitable bearing 178, which may be driven by a reversible motor 154, a reduction gear unit 182, and chain drive 183. When the motor is turned in one direction, the cables 174 and 175, wind up on the drums 180, raising the elevator shoes 157 and 158. When the motor 154, is rotated in the reverse direction, the drums 180 unwind, allowing the cables 174 and 175, to lower the elevator shoes 157 and 158, and stock loads supported thereon.

The shoes 157 and 158, on the two sides of the elevator, are spaced on two sides of a conveyor means 160, so that they will pick up stock load carriers or bunks, 159 or 161, at their ends, when said bunks are placed above them on said conveyor means. The shoes 157 and 158, may be lowered below the surface of the conveyor means 160, at the bottom limit of their travel. The shoe 157, is illustrated as having a lug 156, for actuating the upper and lower limit switches 135 and 137 respectively, and having triggers 134 and 136 respectively, mounted on the elevator column 171. Any other suitable elevator or lift means, and its control, may be employed.

I preferably provide the conveyor means 160, driven, for example, by sprockets 176, on the shaft 184, driven by the motor 155, by means of the reduction gear 177, and the chain drive 179. The chains 160, extend beneath the elevator and out to one end, for conveying completed stock loads 88, on bunks or load carriers 159, off of the elevator shoes 157 and 158, and bringing new empty bunks 161, to a position between the elevator shoes 157 and 158, for building up another stock load. The conveyor chain 160, may be long enough to hold several series of empty bunks 161, spaced, for automatic supply to the elevator.

I preferably provide limit switches 139, having triggers 138, for stopping the conveyor chains 160, when a stock load 88, is loaded and is conveyed out beyond the elevator shoes, and when new bunks 161, have been conveyed into place above the elevator shoes.

The stock loads 88, may be stacked either with or without stickers. When stickers are placed between tiers, suitable sticker guides are preferably provided.

Reference is made to my application Serial No. 624,521 covering improvements in stackers or loaders, which claims the reciprocating loading skid described in this specification.

One means and method of operation of my tiering and loading apparatus may be described as follows:

When the tier 1 of lumber moves forward on the raising and lowering apron 13, it comes in contact with the trigger 27, and closes the circuit in the limit switch 28, making possible the actuation of the solenoid 35, when the loading skid 90 is in the forward position and the circuit has been closed from L—I, through the contacts 120—B of the limit switch 120, closed by the lug 119, actuating the switch 120, by means of the trigger 122, through the line switch 148, through the limit switch 28, through the solenoid 35, and through the contacts 131—B, of the limit switch 131, which is normally closed, and to the other side of the line L—2. This circuit in actuating the solenoid 35, opens the port 36—A, allowing gas pressure to pass through the port 37—B, into the chamber 40, of the cylinder 33, moving the piston 41 downward, and also opening the ports 36—B and 37—A, allowing exhaust gas from the chamber 39, to pass out through passage 34. This downward movement of the piston 41, lowers the apron 13, by means of the piston rod 43, the scotch yoke 42, the pin 45, the piston arm 44, the shaft 46, the skid raising arm 55, the pin 48, the skid connecting rod 47, and the pin 49.

The lowering of the apron 13 releases the tier 1 of lumber onto the loading skid 90. The tier 1 moves forward and actuates the trigger 130, closing contacts 131—C, normally open in the limit switch 131, which operate the contactors 150—A, in the reversing line starter, through the circuit from one side of the line L—I, through the OL contacts, and through the contacts 121—B, of the limit switch 121, normally closed, and contacts 137—A, of switch 137, normally closed, or both, through the stop button 140, through contacts 121—C, normally closed, in limit switch 121, through contacts 131—C, in limit switch 131, through contacts 133—A, normally closed, in switch 133, through the coil 150—A, of the reversing line starter 150, and to other side of line L—2. Making this circuit starts the skid motor 153, which moves the loading skid backward.

When the loading skid 90, has moved to the full backward position, the lug 119, strikes the trigger 123, opening the contacts 121—C, in the limit switch 121, opening the circuit and stopping the motor 153, which remains stopped until the contacts 133—D, of the limit switch 133, are closed by the lowering of the stock load, releasing the trigger 132. The contactor coil 150—A, in the reversing line starter is held closed after the contacts 131—A, opens by an auxiliary contactor 150—A—I, on the contactor 150—A, in order to carry the loading skid 13, to the full backward position. The contacts 121—B, normally closed in the limit switch 121, are opened by the lug 119, striking the trigger 123; and the contacts 137—A, normally closed, are opened by the lug 156, on the shoe 157, actuating the trigger 136, of the switch 137, and thus stopping loading skid 90, in the backward position until the contacts 133—D, of the limit switch 133, are closed by the lowering of the stock load releasing trigger 132, and also during the time the completed stock load 88, is being removed from elevator by the chain 160, and the new bunks 161, are being elevated to the loading position.

The raising of the apron 13, takes place during the time the loading skid 90, is moving backward. The tier 1 of lumber, on actuating trigger 130, in limit switch 131, opens the contacts 131—B, in limit switch 131, opens the circuit and de-energizes the solenoid operated valve 35, connecting the ports 36—A and 36—B, also the ports 37—B and 37—A, which allows the gas to pass through the ports 36—A and 36—B, into the chamber 39, of the cylinder 33, thus moving the piston 41, upward and allowing the exhaust gas from the chamber 40, to escape through the ports 37—B and 37—A. The upward movement of piston 41, raises the apron 13, by means of the piston rod 43, the scotch yoke 42, the pin 45, the piston arm 44, the shaft 46, the skid raising arm 55, the pin 48, the skid connecting rod 47, and the pin 49. Pressure is maintained in the chamber 39, to hold the apron 13 up until a new tier has filled the apron 13 and actuated the limit switch 28, and the loading skid 90, has reached the full forward position, and the limit switch 120, has been actuated.

As soon as contacts 133—B in the limit switch 133, are closed by the retraction of the loading skid 90, and the pullback 98, pulling the last board of the tier 1, on stock load against the trigger 132, closing the circuit to coil 151—A, in the reversing line starter 151, the circuit is closed from L—I, through OL contactors, the stop button 143, the contacts 133—B, in limit switch 133, the contacts 137—B, in the limit switch 137, which are normally closed, and the coil 151—A, to the other side of the line L—2. Closing this circuit starts the elevator motor 154, which lowers the elevator until the contacts 133—B, opens the circuit by the stock load 88, being lowered below the trigger 132, releasing it and stopping the motor 154.

The contacts 137—B, in the limit switch 137, are normally closed, and are actuated only when the elevator shoes 157, have reached the lowest limit of their travel, and the bunks 159, are resting on the chains 160. The push button 144, may be used for manually lowering the elevator shoes 157. The contactors 151—A, in the reversing line starter 151, are held closed by the contacts 133—B, of the limit switch 133, and the circuit is opened to stop the motor 154, by the opening of the contacts 133—B of the limit switch 133, accomplished by the release of the trigger 132, by the lowering of the stock load 88.

When the lowering of the top of the stock load 88, releases trigger 132, the contacts 133—D, in the switch 133, automatically close. A circuit is thus set up to operate the motor 153, and move the loading skid 90, forward. This is accomplished by energizing the coil 150—B, in the reversing line starter 150, and closing the circuit from one side of the line L—I, through the OL contactors and through contacts 121—B, in the limit switch 121, which are normally closed, through contacts 137—A, of limit switch 137, which are normally closed, or through both, and through the stop push button 140, through the contactors 121—A, in limit switch 121, which were closed by the lug 119, actuating the trigger 123, through the contactors 120—A, in the limit switch 120, which are normally closed, but which are opened by the lug 119, striking the trigger 122, through contacts 133—D, in limit switch 133, which were closed previously by the lowering of the top of the stock load 88, closing the circuit through the coil 150—B, in the reversing line starter 150, and to the other side of the line L—2. This circuit starts the motor 153, to move the loading skid 90, forward. When the lug 119, on the loading skid drive chain 114, strikes the trigger 122, on the limit switch 120, it opens the contacts 120—A, stopping the motor 153, and the loading skid in the forward position. The closing of the contacts 120—B, of the limit switch 120, by the loading skid reaching the full forward position, following the closing of the contacts in the limit switch 28, by the tier 1 of lumber striking the trigger 27, starts the operation of loading another tier on the stock load 88. The push button 142, is for the manual starting of the forward movement of the loading skid 90. The contactor 150—B, of the reversing line starter 150, is held in position after 133—D or 135—A, have closed, by means of an auxiliary contactor 150—B—1, of contactor 150—B.

When the elevator has reached its lower limit of travel, which occurs when the stock load is fully loaded, the bunks 159, rest on the chains 160, and the lug 156, in elevator shoe 157, strikes and trips the trigger 136, closing the contacts 137—C, of the limit switch 137, which closes the circuit from one side of the line L—1, through the OL contactors, through the contacts 139—B, in the limit switch 139, which is normally closed, through the stop push button 146, through the contacts 137—C, in limit switch 137, and through the coil 152—A, in the line starter 152, to the other side of the line L—2. This circuit starts the motor 155, which causes the chains 160, to move, conveying the stock load 88, from the stacking position on the shoes 157, off to a position at one side of the elevator, and at the same time moving new bunks 161, on the chains 160, into the stacking position above the shoes 157 and 158, to be elevated ready to be loaded. The chains 160, are stopped by the bunks 159, when moving out to one side, actuating the trigger 138, and opening the contacts 139—B, in limit switch 139. The actuation of the trigger 138, by the bunk 159, also closes the contacts 139—A, which closes the circuit to the motor 154, starting the motor for raising the bunk 161, for loading another stock load. The push button 147, may be used for the manual starting of the chains 160, at any time for any purpose. The contactor 152—A, in the reversing line starter 152, is held closed after 137—C, is closed by an auxiliary contactor 152—A—1 on contactor 152—A.

When the trigger 138, of the limit switch 139, on the stock load conveyer chain 160, is actuated by the bunk or load carrier 159, of the stock load 88, after being moved off of the elevator shoes 157 and 158, the circuit is closed from one side of the line L—1, through the OL contactor, through the stop button 143, through contacts 139—A, in the limit switch 139, through the contacts 135—B, in the switch 135, which are normally closed, and through the coil 151—B, in the reversing line starter 151, to the other side of the line L—2, to raise the elevator. In raising of the elevator, the lug 156, on the shoe 157, actuates the trigger 134 of the limit switch 135, opening the contacts 135—B, stopping the motor 154, and stopping the elevator in the up or loading position, also closing the contacts 135—A, in limit switch 135, starting the forward movement of the loading skid 90. Means are provided for holding the contacts 135—A, closed until the lug 156, on the shoe 157, trips the trigger 136, on the limit switch 137. This means comprises a circuit from the line L—1, through the contacts 137—D, of the limit switch 137, which is normally closed, through the single pole contactor 128, through the contacts 135—C, of the limit switch 135, which is closed by the lug 156, on the shoe 157, striking the trigger 134, to the other side of the line L—2. The push button 145, controls the manual raising of the elevator when desired. The contactor 151—B in the reversing line starter 151, is held closed after the contacts 139—A close, by means of an auxiliary contactor 151—B—1, on the contactor 151—B.

The loading operation may be started or stopped by a line switch 148, and the cycle of loading may be repeated as often as desired, and until an operator stops the operation by opening the switch 148. The motors 153, 154 and 155, preferably have electric brakes 17, which stop the momentum of the motors respectively by spring pressure, when the circuits operating the motors are broken. The brakes are released when the motor circuits are closed.

In some cases my tiering and feeding apparatus may be used for feeding material for a process, for example, a drying process, instead of a loader as described. In such cases see Figure IV for example, I preferably employ a plurality of smooth top conveyor chains 188, which may be driven by any suitable means, for example, the motor 240, the reduction unit 241, and the chain drive 242, to form a conveyor means for a sheet of material. A sheet of material 189, for example, lumber, with boards edge to edge in a continuous sheet, is supplied on said conveyor from any suitable source of supply.

I preferably provide a plurality of overhead stops 190, having cushions 191, aligned transversely above the conveyor chains 188. The stop may be raised and lowered by any suitable means, to stop and release the material 189 in tiers, for example, by a double acting cylinder 193, having a piston 194, a piston rod 195, attached to the stop 190. The cylinder 193, has an upper chamber 198, and a lower chamber 199, connected to a four-way solenoid valve 200. The solenoid valve 200, preferably has valves 201 and 202, and the ports 202—A, 202—B, 203—A and 203—B. When the solenoid 200 is energized, to lower the piston 194, the port 202—A is open to port 203—B, and the port 202—B is open to the port 203—A, through the passage 204, supplying compressed air, for example, through the pipe 205, into the air chamber 198, which lowers the piston 194, exhausting the contents of the chamber 199, and thrusting the cushion 191, of the stop 190 downward, and clamping the tier of material against the elevating member 209, extending transversely across said conveyor, beneath said stops. The elevated member 209, of the conveyor may align the stock at right angles to the conveyor chain 188, as stock is pushed over it by the momentum of the stock 189, on the chain 188, behind it. The material which is clamped, is elevated slightly above the conveyor chain 188, allowing the chain to slide under the tier of material below the cushion 191, without the pressure of the cushion upon the chain. The chain 188, continue to travel, sliding underneath the sheet of material behind the overhead stop, and conveying the tier of material between the overhead stop 190, and the limit switch 230, on beyond the limit switch until the last board of the tier passes beyond the trigger 231, allowing it to rise automatically, thus raising the overhead stop. In some cases the separate conveyor chain 188 may be driven by a separate motor, which may be stopped when the limit switch 230, is actuated, and the stop 190 is applied.

One means and method of operation of my tiering and feeding apparatus may be as follows:

The tier of lumber 189, when moving forward on the chain 188, actuates the trigger 231, of the limit switch 230, which may be positioned at any desired distance from the overhead stop 190, to determine the width of each tier, closing the circuit from L—1, through the line switch 235, through the contacts in the limit switch 230, through the solenoid 200, to the other side of the line L—2. This circuit when closed, energizes the solenoid and operates the valves 201 and 202, to open the ports and allow gas to pass from the pipe 205, through ports 202—A and 203—B, into chamber 198, of cylinder 193, forcing the pistons 194 downward, and exhausting the gas from the chamber 199, through the port 203—A, the passage 204, and the port 202—B. This downward movement of piston 194, by means of the piston rod 195, and the stop 190, thrusts the cushion 191 downward, to pinch the tier of lumber 189, against the elevating member 209, stopping the movement of that portion of the tier of lumber 189, which is behind the cushion 191, on the conveyor chain 188, and releasing a tier of lumber on the discharge side, allowing it to move with the chain 188, until it passes beyond and releases the trigger 231, on the limit switch 230, opening the circuit and de-energizing the solenoid 200. Opening the circuit to the solenoid valve operates the valves 201 and 202, to allow gas to pass from pipe 205, through the ports 202—A and 203—A, into the chamber 199, of the cylinder 193, moving the piston 194 upward, and exhausting the gas from the chamber 198, in cylinder 193, out through the ports 203—B and 202—B. The upward movement of the piston 194, by means of the piston rod 195, and the socket 190, raises the cushion 191, to release the sheet of lumber 189, and allow the tier of lumber 189, to be conveyed forward by the chain 188, until the trigger 231, on the limit switch 230, is again actuated.

Each tier of stock, as it is segregated, may be conveyed to an apron of a loader, or to a dryer, or other process.

It is intended that any step in the tiering, feeding or loading operation may be accomplished manually if desired.

It is understood that this invention is not limited to the exact design and form illustrated and described. Modifications of the structures and methods herein described, and mechanical and electrical equivalents are self-evident to those skilled in the art; therefore, it is to be understood that the invention includes within its scope whatever changes fairly come within either the terms or the spirit of the appended claims.

Having described my invention, what I claim is:

1. A feeding and tiering device, comprising conveyor means for a sheet of material, a stop for said sheet, means for elevating said sheet above said conveyor means beneath said stop, a tier measuring means actuated by said material spaced ahead of said stop, said means controlling the operation of said stop, and control means therefor, comprising means for alternately stopping said sheet for releasing a tier and releasing said stop, to feed and tier substantially as specified.

2. A feeding and tiering device, comprising conveyor means for a sheet of material, a stop for said sheet, means for elevating said sheet above said conveyor means beneath said stop, a tier measuring means actuated by said material spaced ahead of said stop, said means controlling the operation of said stop, and automatic control means therefor, comprising means for alternately stopping said sheet for releasing a tier and releasing said stop, iterating automatically, to feed and tier substantially as specified.

3. A tiering apparatus, comprising a conveyor for a sheet of material, a stop above said sheet, means for elevating above said conveyor that part of said sheet below said stop, control means for said stop, said control means comprising means for measuring a tier beyond said stop, releasing and removing said tier, and raising said stop, for repeating the operation substantially as specified.

4. A tiering apparatus comprising a conveyor for a sheet of material, an automatic stop above said sheet, means for elevating above said conveyor that part of the sheet below said stop, automatic control means for said stop, said control means comprising means for measuring a tier beyond said stop, releasing and removing said tier, and raising said stop, for automatically repeating the operation substantially as specified.

5. A feeding and tiering apparatus, comprising a conveyor for a sheet of material, means for driving said conveyor, an elevating member extending transversely across said conveyor, stops above said sheet, said elevating member being beneath said stops, a measuring means in the path of said sheet of material, spaced away from said stop for measuring a tier of said material, means by which the forward edge of said sheet of material actuates said measuring means for actuating said stop to clamp said sheet between said stop and said elevating member above said moving conveyor, whereby a tier is separated from said sheet of material and conveyed beyond said measuring means, thereby releasing said measuring means, actuating means whereby said stop is raised and said conveyor chain moves said sheet forward to repeat the measuring and tiering process.

6. A feeding and tiering apparatus, comprising a conveyor for a sheet of material, means for driving said conveyor, a plurality of overhead stops, a stock elevating member below said stops, a measuring means in the path of said sheet of material, adjustable for distance away from said stop for measuring a tier of said material, means by which the forward edge of said sheet of material actuates said measuring means to lower said stops and to raise said stock elevating member to clamp said sheet between said stop and said elevating member, above said moving conveyor, whereby separating said tier from said sheet of material, means for raising said stops, and lowering said elevating member, whereby said conveyor chain moves said sheet forward to repeat the measuring and tiering process.

7. A feeding and tiering apparatus, comprising a conveyor for a sheet of material, means for driving said conveyor, a plurality of overhead stops, aligned transversely above said sheet of material, an elevating member for said sheet below said stops, a measuring means in the path of said sheet of material, adjustable for distance away from said stop to measure a tier of said material, an apron hinged near said stops for supporting said tier between said stops and said measuring means, means by which the forward edge of said sheet of material actuates said measuring means to lower said stops for clamping said sheet above said moving conveyor, and to lower the end of said apron adjacent to said measuring means for separating said tier from said sheet of material, means for raising said stops, and raising said apron, whereby said conveyor moves said sheet forward to repeat the measuring and tiering process.

8. A feeding, tiering, and loading apparatus, comprising a supply conveyor, for a sheet of material, means for successively measuring and releasing tiers from said sheet, comprising an overhead stop, and a measuring means ahead of said stop for actuating it, a reciprocable skid, means for feeding each of said tiers to said skid when it is positioned above a stock load, and means for retracting said skid from above said stock load beneath said conveyor, whereby said tiers of material are loaded on said stock load, substantially as specified.

9. A feeding, tiering, and loading apparatus, comprising a supply conveyor for a sheet of material, means for successively measuring and releasing tiers from said sheet, comprising an overhead stop, and a measuring means ahead of said stop for actuating it, a reciprocable skid, means for feeding each of said tiers at intervals to said skid when it is positioned above a stock load, an elevator for maintaining the top of said stock load at a suitable loading level, means for retracting said skid from above said stock load beneath said conveyor, whereby said tiers of material may be successively loaded on said stock load.

10. An automatic feeding, tiering, and loading device, comprising a supply conveyor for a sheet of material, automatic means for successively measuring and releasing tiers from said sheet, comprising an overhead stop, and a measuring means ahead of said stop for actuating it, a reciprocable skid, means for feeding each of said tiers at intervals to said skid, when it is positioned above a stock load, an automatic elevator comprising means for maintaining the top of said stock load at a suitable loading level, said elevator being responsive to the laying of a tier on said load, means for retracting said skid from above said stock load, said means being actuated by said tier, whereby said tiers of material are successively loaded on said stock load, and means of repeating this sequence of operations until a load is stacked.

11. A synchronized automatic loading device, comprising a conveyor for a sheet of boards varying in width, means for tiering said sheet, said means comprising an overhead stop and a measuring means ahead of said stop for actuating it, means for loading said tier, means for maintaining a loading level of a stock load, said loading means comprising a skid and means for its reciprocation alternately above said elevator and beneath said conveyor, the movement of said elevator being responsive to the loading of said tier, said overhead stop also being actuated by the loading of a tier for releasing said sheet and for repeating the loading operation.

12. A loader, comprising a conveyor for a sheet of material, means actuated by the movement of said sheet for segregating it into a series of tiers, one tier at a time, means actuated by said segregating means for feeding said tier to a machine, means for the disposal of said tier by said machine which is actuated by said tier, said means comprising means for the further actuation of said segregating means, whereby the operation is repeated.

13. A tiering and loading apparatus, comprising a conveyor for a sheet of material, a stop above said sheet, means for elevating above said conveyor that part of said sheet below said stop, control means for said stop, said control means comprising means for measuring a tier beyond said stop for releasing said tier, and for raising said stop, means actuated by said control means for loading said tier on a load, and means actuated by the loading of said tier for repeating the operation.

ALBERT THORNTON FAY, Jr.